US012598665B2

(12) United States Patent
Li et al.

(10) Patent No.: US 12,598,665 B2
(45) Date of Patent: Apr. 7, 2026

(54) CONNECTION RESUME METHOD AND APPARATUS

(71) Applicant: HUAWEI TECHNOLOGIES CO., LTD., Shenzhen (CN)

(72) Inventors: Fei Li, Shenzhen (CN); Juan Deng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 585 days.

(21) Appl. No.: 17/738,673

(22) Filed: May 6, 2022

(65) Prior Publication Data

US 2022/0264689 A1 Aug. 18, 2022

Related U.S. Application Data

(63) Continuation of application No. PCT/CN2020/110798, filed on Aug. 24, 2020.

(30) Foreign Application Priority Data

Nov. 8, 2019 (CN) .......................... 201911089532.6
Jan. 22, 2020 (CN) .......................... 202010075775.0

(51) Int. Cl.
*H04W 76/19* (2018.01)
*H04W 8/24* (2009.01)
*H04W 12/106* (2021.01)

(52) U.S. Cl.
CPC ............. *H04W 76/19* (2018.02); *H04W 8/24* (2013.01); *H04W 12/106* (2021.01)

(58) Field of Classification Search
CPC ....... H04W 76/27; H04W 12/60; H04W 8/24; H04W 12/106; H04W 76/19
See application file for complete search history.

(56) References Cited

U.S. PATENT DOCUMENTS

2018/0020382 A1* 1/2018 Kim ........................ H04W 8/22
2019/0174366 A1 6/2019 Susitaival et al.
(Continued)

FOREIGN PATENT DOCUMENTS

CN 109644354 A 4/2019
CN 109803258 A 5/2019
(Continued)

OTHER PUBLICATIONS

Huawei, Hisilicon, Protection against tampering RRCResumeRequest message [online], 3GPP TSG SA WG3 #95 S3-191241, 6 May 10, 2019, Total 2 Pages.
(Continued)

*Primary Examiner* — Congvan Tran
(74) *Attorney, Agent, or Firm* — WOMBLE BOND DICKINSON (US) LLP

(57) ABSTRACT

Embodiments of this application provide a connection resume method and an apparatus. The method includes: A terminal device sends a first message that carries first indication information to a first network device. The first indication information is used to indicate to calculate a resume MAC value based on a first parameter set. The first parameter set includes one or more of a resume cause value or an RRC resume request message. The terminal device receives a second message from the first network device. When the second message carries second indication information, the terminal device sends an RRC resume request message that carries the resume MAC value to a second network device. The second indication information is used to indicate to verify the resume MAC value based on the first parameter set.

14 Claims, 11 Drawing Sheets

(56) References Cited

U.S. PATENT DOCUMENTS

| | | | | |
|---|---|---|---|---|
| 2019/0289528 | A1* | 9/2019 | Lou | H04W 76/11 |
| 2020/0178208 | A1* | 6/2020 | Kim | H04W 76/15 |
| 2020/0187291 | A1* | 6/2020 | Sha | H04W 52/02 |
| 2020/0214070 | A1* | 7/2020 | Ingale | H04W 74/0833 |
| 2020/0314836 | A1* | 10/2020 | Xu | H04L 5/001 |
| 2020/0351818 | A1* | 11/2020 | Park | H04W 52/0216 |
| 2020/0383164 | A1* | 12/2020 | Kim | H04W 76/12 |
| 2021/0160951 | A1* | 5/2021 | Lee | H04W 76/27 |
| 2022/0070670 | A1* | 3/2022 | Wu | H04L 63/123 |
| 2022/0070814 | A1* | 3/2022 | Chun | H04W 60/04 |
| 2022/0264680 | A1* | 8/2022 | Kim | H04W 76/15 |
| 2022/0279619 | A1* | 9/2022 | Wu | H04W 12/106 |
| 2023/0164867 | A1* | 5/2023 | Cheng | H04W 76/27 |
| | | | | 370/252 |

FOREIGN PATENT DOCUMENTS

| | | | |
|---|---|---|---|
| CN | 109803456 | A | 5/2019 |
| EP | 3407666 | A1 | 11/2018 |
| WO | 2018166331 | A1 | 9/2018 |
| WO | 2019030727 | A1 | 2/2019 |
| WO | 2019096171 | A1 | 5/2019 |
| WO | 2019178755 | A1 | 9/2019 |

OTHER PUBLICATIONS

Qualcomm Incorporated,"Security for RRC Resume",3GPP TSG-RAN2#103 R2-1811697,Gothenburg, Sweden, Aug. 20-24, 2018, Total 2 Pages.

Ericsson,"draft CR for RRC Connection Suspend and Resume",3GPP TSG-RAN WG2 Meeting #93 R2-161744, St. Julian s, Malta, Feb. 15-19, 2016, Total 21 Pages.

InterDigital Communications,"Procedures for State Transition in RRC Inactive",3GPP TSG-RAN WG2#97bis R2-1702884,Spokane, Washington Apr. 3-7, 2017, Total 3 Pages.

Huawei et al.,"Support of RNA update without context relocation",3GPP TSG-RAN WG2 Meeting#103 R2-1812507, Gothenburg, Sweden, Aug. 20-24, 2018, Total 4 Pages.

3GPP TS 33.401 V16.0.0 (Sep. 2019),3rd Generation Partnership Project;Technical Specification Group Services and System Aspects;3GPP System Architecture Evolution (SAE);Security architecture(Release 16), Total 163 Pages.

Intel Corporation,"RNAU without UE context relocation", 3GPP TSG RAN WG2 Meeting #103bis R2-1813973, Chengdu, China, Oct. 8-12, 2018, Total 2 Pages.

* cited by examiner

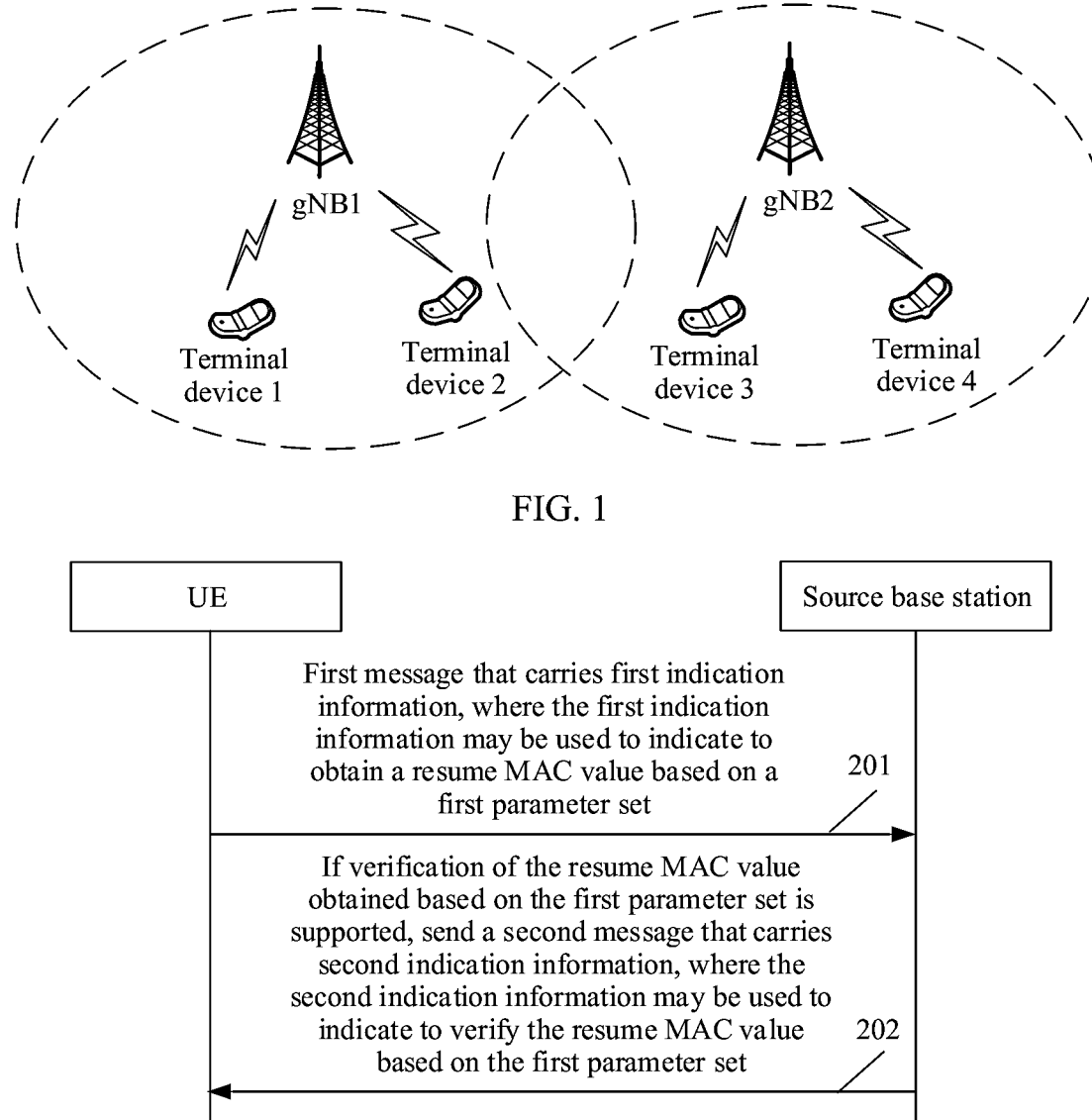

FIG. 1

| UE | | Source base station |
|---|---|---|
| | First message that carries first indication information, where the first indication information may be used to indicate to obtain a resume MAC value based on a first parameter set    201 | |
| | If verification of the resume MAC value obtained based on the first parameter set is supported, send a second message that carries second indication information, where the second indication information may be used to indicate to verify the resume MAC value based on the first parameter set    202 | |

FIG. 2

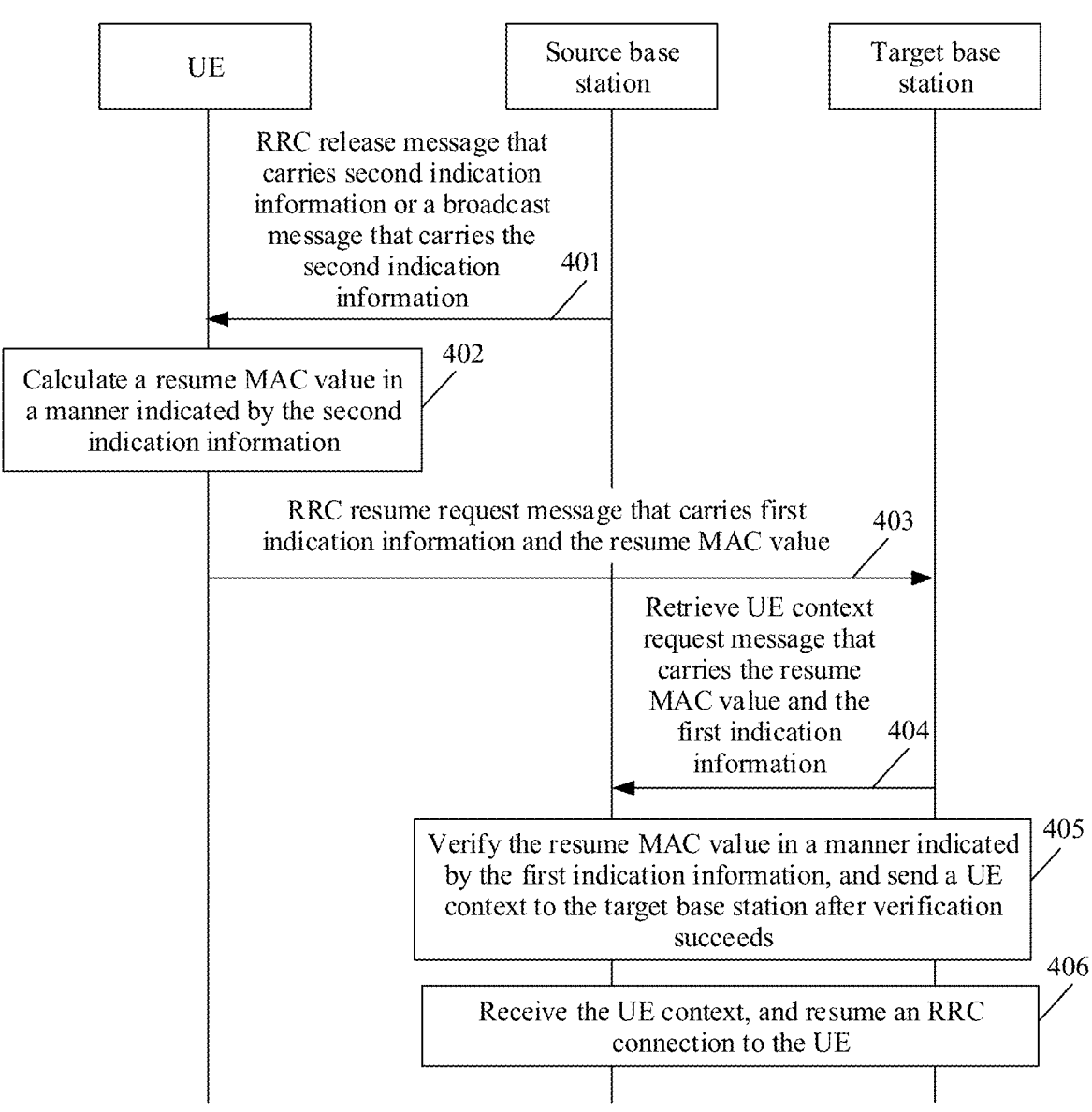

UE

Source base station

Target base station

RRC release message that carries second indication information or a broadcast message that carries the second indication information　401

Calculate a resume MAC value in a manner indicated by the second indication information　402

RRC resume request message that carries first indication information and the resume MAC value　403

Retrieve UE context request message that carries the resume MAC value and the first indication information　404

Verify the resume MAC value in a manner indicated by the first indication information, and send a UE context to the target base station after verification succeeds　405

Receive the UE context, and resume an RRC connection to the UE　406

FIG. 4

CONNECTION RESUME METHOD AND APPARATUS

CROSS-REFERENCE TO RELATED APPLICATIONS

This application is a continuation of International Application No. PCT/CN2020/110798, filed on Aug. 24, 2020. The International Application claims priority to Chinese Application No. 202010075775.0, filed on Jan. 22, 2020 and Chinese Application No. 201911089532.6, filed on Nov. 8, 2019. All of the aforementioned patent applications are hereby incorporated by reference in their entireties.

TECHNICAL FIELD

This application relates to the field of communications technologies, and in particular, to a connection resume method and an apparatus.

BACKGROUND

The 3rd Generation Partnership Project (3GPP) defines suspend and resume procedures of a terminal device. In a suspend phase, a base station may send a resume identifier (resume ID) to the terminal device. When the terminal device initiates a resume procedure, the base station needs to verify the terminal.

Therefore, how to verify the terminal is a problem that needs to be resolved.

SUMMARY

Embodiments of this application provide a connection resume method and an apparatus, to effectively ensure that a manner of verifying a resume MAC value by a network device is corresponding to a manner of calculating the resume MAC value by a terminal device.

According to a first aspect, an embodiment of this application provides a connection resume method. The method includes: A terminal device sends a first message that carries first indication information to a first network device. The first indication information is used to indicate to calculate a resume message authentication code (MAC) value based on a first parameter set. The first parameter set includes one or more of a resume cause value or a radio resource control (RRC) resume request message. The terminal device receives a second message from the first network device. When the second message carries second indication information, the terminal device sends an RRC resume request message that carries the resume MAC value to a second network device. The second indication information is used to indicate to verify the resume MAC value based on the first parameter set.

In this embodiment of this application, the terminal device interacts with the first network device, so that the terminal device can learn whether the first network device supports verification of the resume message authentication code (MAC) value calculated by using an additional parameter (that is, the resume cause value or the RRC resume request), and the first network device can learn whether the terminal device supports calculation of the resume MAC value by introducing the additional parameter. In this way, the terminal device can protect the RRC resume request message in an appropriate manner, and the first network device can verify the RRC resume request message in an appropriate manner.

In one embodiment, the first message is an access stratum (AS) security mode complete message, or the first message is a terminal device capability information message.

In one embodiment, the second message is an RRC release message, or the second message is a broadcast message.

According to a second aspect, an embodiment of this application provides a connection resume method. The method includes: A first network device receives a first message that is from a terminal device and that carries first indication information. The first indication information is used to indicate to calculate a resume message authentication code (MAC) value based on a first parameter set. The first parameter set includes one or more of a resume cause value or a radio resource control (RRC) resume request message. The first network device sends a second message that carries second indication information to the terminal device. The second indication information is used to indicate to verify the resume MAC value based on the first parameter set.

In one embodiment, the method further includes: The first network device receives a retrieve UE context request message that carries the resume MAC value. The first network device verifies the resume MAC value based on the first parameter set.

In one embodiment, the first message is an access stratum (AS) security mode complete message, or the first message is a terminal device capability information message.

In one embodiment, the second message is an RRC connection release message, or the second message is a broadcast message.

According to a third aspect, an embodiment of this application provides a communications apparatus. The apparatus includes: a sending unit, configured to send a first message that carries first indication information to a first network device, where the first indication information is used to indicate to calculate a resume message authentication code (MAC) value based on a first parameter set, and the first parameter set includes one or more of a resume cause value or a radio resource control (RRC) resume request message; a receiving unit, configured to receive a second message from the first network device. The sending unit is further configured to: when the second message carries second indication information, the terminal device sends an RRC resume request message that carries the resume MAC value to a second network device, where the second indication information is used to indicate to verify the resume MAC value based on the first parameter set.

In one embodiment, the first message is an access stratum (AS) security mode complete message, or the first message is a terminal device capability information message.

In one embodiment, the second message is an RRC release message, or the second message is a broadcast message.

According to a fourth aspect, an embodiment of this application provides a communications apparatus. The apparatus includes: a receiving unit, configured to receive a first message that is from a terminal device and that carries first indication information, where the first indication information is used to indicate to calculate a resume message authentication code (MAC) value based on a first parameter set, and the first parameter set includes one or more of a resume cause value or a radio resource control (RRC) resume request message; and a sending unit, configured to send a second message that carries second indication information to the terminal device, where the second indication information is used to indicate to verify the resume MAC value based on the first parameter set.

In one embodiment, the receiving unit is further configured to receive a retrieve UE context request message that carries the resume MAC value. The apparatus further includes: a processing unit, configured to verify the resume MAC value based on the first parameter set.

In one embodiment, the first message is an access stratum (AS) security mode complete message, or the first message is a terminal device capability information message.

In one embodiment, the second message is an RRC release message, or the second message is a broadcast message.

According to a fifth aspect, an embodiment of this application provides a communications apparatus. The communications apparatus includes a processor. When the processor invokes a computer program in a memory, the method according to the first aspect or any one of the possible embodiments of the first aspect is performed.

According to a sixth aspect, an embodiment of this application provides a communications apparatus. The communications apparatus includes a processor and a memory. The memory is configured to store computer-executable instructions. The processor is configured to execute the computer-executable instructions stored in the memory, so that the communications apparatus performs the corresponding method shown in the first aspect or any one of the possible embodiments of the first aspect.

According to a seventh aspect, an embodiment of this application provides a communications apparatus. The communications apparatus includes a processor, a memory, and a transceiver. The transceiver is configured to receive a signal or send a signal. The memory is configured to store program code. The processor is configured to invoke the program code from the memory to perform the method according to the first aspect or any one of the possible embodiments of the first aspect.

According to an eighth aspect, an embodiment of this application provides a communications apparatus. The communications apparatus includes a processor and an interface circuit. The interface circuit is configured to receive code instructions and transmit the code instructions to the processor. The processor runs the code instructions to perform the corresponding method shown in the first aspect or any one of the possible embodiments of the first aspect.

According to a ninth aspect, an embodiment of this application provides a communications apparatus. The communications apparatus includes a processor, a memory, and a transceiver. The transceiver is configured to receive a signal or send a signal. The memory is configured to store program code. The processor is configured to invoke the program code from the memory to perform the method according to the second aspect or any one of the possible embodiments of the second aspect.

According to a tenth aspect, an embodiment of this application provides a communications system. The communications system includes a terminal device and a first network device. The terminal device may be configured to perform the method according to the first aspect or any one of the possible embodiments of the first aspect. The first network device is configured to perform the method according to the second aspect or any one of the possible embodiments of the second aspect.

According to an eleventh aspect, an embodiment of this application provides a computer-readable storage medium. The computer-readable storage medium is configured to store instructions. When the instructions are executed, the method according to the first aspect or any one of the possible embodiments of the first aspect is implemented.

According to a twelfth aspect, an embodiment of this application provides a computer-readable storage medium. The computer-readable storage medium is configured to store instructions. When the instructions are executed, the method according to the second aspect or any one of the possible embodiments of the second aspect is implemented.

According to a thirteenth aspect, an embodiment of this application provides a computer program product including instructions. When the instructions are executed, the method according to the first aspect or any one of the possible embodiments of the first aspect is implemented.

According to a fourteenth aspect, an embodiment of this application provides a computer program product including instructions. When the instructions are executed, the method according to the second aspect or any one of the possible embodiments of the second aspect is implemented.

According to a fifteenth aspect, an embodiment of this application provides a connection resume method. The method includes:

A terminal device receives a twelfth message from a first network device, and receives a thirteenth message from a second network device. If the twelfth message carries a resume message protection support feature of the first network device and the thirteenth message carries a resume message protection support feature of the second network device, a terminal device sends an RRC resume request message that carries a resume MAC value to the second network device. The resume MAC value is obtained by using a first parameter set.

In one embodiment, before the terminal device sends the RRC resume request message that carries the resume MAC value to the second network device, the method further includes: The terminal device activates a resume message protection support feature of the terminal device, to obtain the resume MAC value.

In one embodiment, the first parameter set includes all or a part of information in the RRC resume request message.

According to a sixteenth aspect, an embodiment of this application provides a connection resume method. The method includes:

A first network device obtains capability information of a terminal device. The first network device receives a retrieve UE context request message sent by a second network device. If a resume message protection support feature of the terminal device is carried in the capability information, and a third parameter set or tenth indication information is carried in the retrieve UE context request message, the first network device activates a resume message protection support feature of the first network device.

The first network device activates the resume message protection support feature. That is, the first network device may verify a resume MAC value carried in the retrieve UE context request message.

The tenth indication information is used to indicate the first network device to activate the resume message protection support feature. The third parameter set may include a same parameter as a first parameter set, or the third parameter set may be a subset of the first parameter set. For example, the first parameter set includes a resume cause value and an idle information bit. The third parameter set may include a subset of the first parameter set, for example, the resume cause value.

In one embodiment, that a first network device obtains capability information of a terminal device includes:

The first network device receives the capability information sent by the terminal device, or the first network device receives the capability information sent by a core network device.

According to a seventeenth aspect, an embodiment of this application provides a connection resume method. The method includes:

A second network device receives an RRC resume request message that is from a terminal device and that carries a resume MAC value. The second network device sends a retrieve UE context request message to a first network device. A third parameter set or tenth indication information is carried in the retrieve UE context request message.

The tenth indication information is used to indicate the first network device to activate a resume message protection support feature. The third parameter set may include a same parameter as a first parameter set, or the third parameter set may be a subset of the first parameter set.

The third parameter set or the tenth indication information is carried, so that the first network device can activate the resume message protection support feature of the first network device after receiving the retrieve UE context request message.

BRIEF DESCRIPTION OF DRAWINGS

FIG. 1 is a schematic diagram of an architecture of a communications system according to an embodiment of this application;

FIG. 2 is a schematic flowchart of a connection resume method according to an embodiment of this application;

FIG. 4 is a schematic flowchart of a connection resume method according to an embodiment of this application;

DESCRIPTION OF EMBODIMENTS

Figure 3:
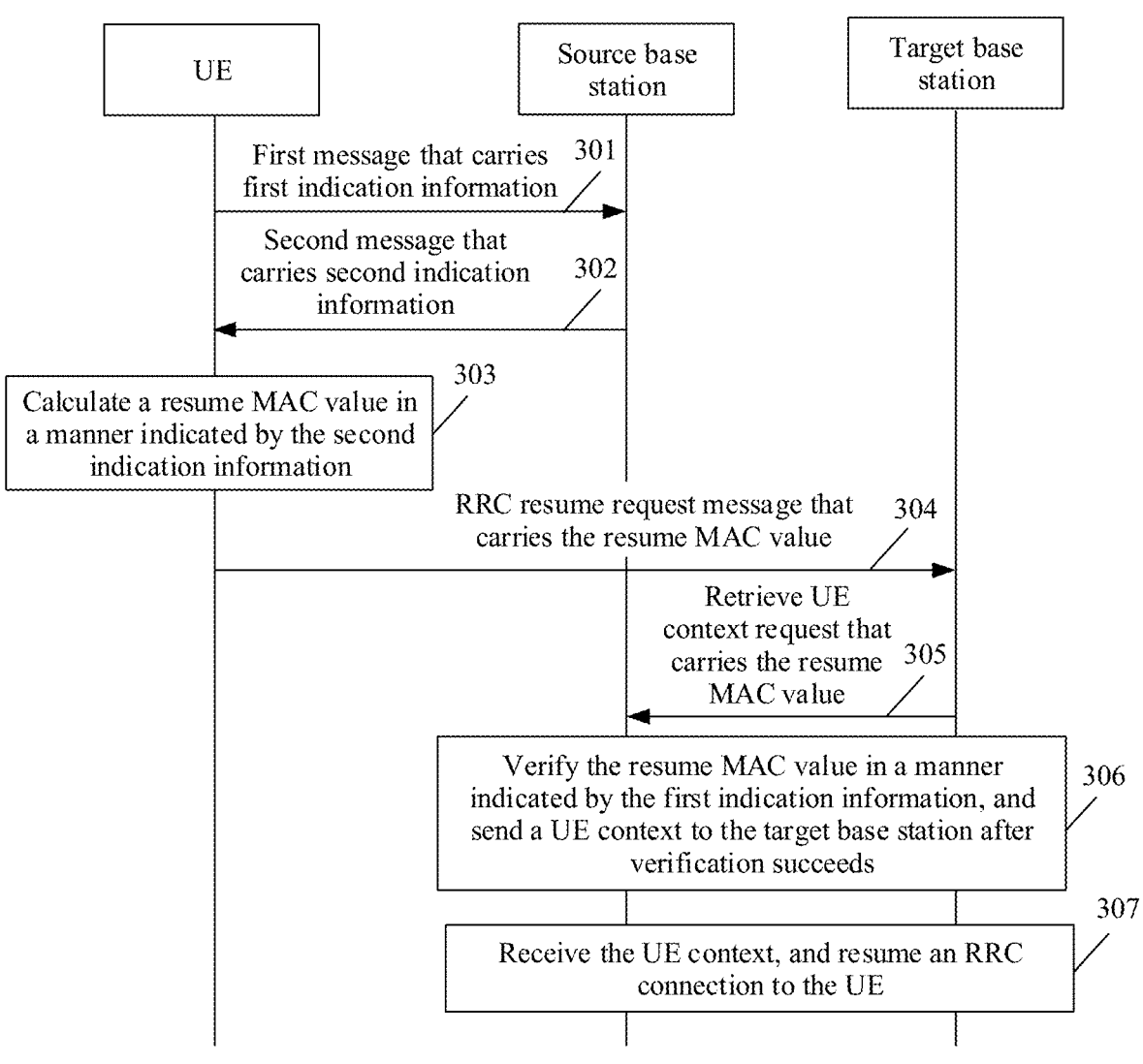
FIG. 3 is a schematic flowchart of a connection resume method according to an embodiment of this application.

In this application, terms such as "first", "second", "third", and "fourth" in the specification, the claims, and the accompanying drawings are intended to distinguish between different objects but do not indicate a particular order. In addition, terms such as "including" and "having" and any other variants thereof are intended to cover a non-exclusive inclusion. For example, a process, method, system, product, or device that includes a series of operations or units is not limited to the listed operations or units, but further includes operations or units that are not listed. Alternatively, other operations or units inherent to the process, method, product, or device are further included.

"Embodiment" mentioned in this specification means that a particular feature, structure, or characteristic described with reference to the embodiment may be included in at least one embodiment of this application. The phrase appearing at various locations in this specification does not necessarily refer to a same embodiment, and is not an independent or alternative embodiment mutually exclusive to another embodiment. A person skilled in the art explicitly and implicitly understands that embodiments described in this specification may be combined with other embodiments.

In this application, "at least one (item)" means one or more, "a plurality of" means two or more, "at least two (items)" means two or three or more. The term "and/or" is used to describe an association relationship between associated objects and indicates that three relationships may exist. For example, "A and/or B" may indicate the following three cases: Only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural.

The following describes embodiments of this application with reference to accompanying drawings.

A communications system used in this application may be understood as a wireless cellular communications system, a wireless communications system based on a cellular network architecture, or the like. A method provided in this application may be applied to various communications systems, for example, an internet of things (IoT) system, a narrowband internet of things (NB-IoT) system, a long term evolution (LTE) system, a 5th generation (5G) communications system, an LTE and 5G hybrid architecture, a 5G new radio (NR) system, and a new communications system (for example, 6G) emerging in future communications development. FIG. 1 is a schematic diagram of a communications system according to an embodiment of this application. Solutions in this application are applicable to the communications system. The communications system may include at least one network device, where only two network devices are shown, for example, a gNodeB (the next generation Node B, gNB) 1 and a gNB2 in FIG. 1; one or more terminal devices connected to the gNB1, for example, a terminal device 1 and a terminal device 2 in FIG. 1; and one or more terminal devices connected to the gNB2, for example, a terminal device 3 and a terminal device 4 in FIG. 1.

The network device may be a device that can communicate with the terminal device. The network device may be any device having a wireless transceiver function, and includes but is not limited to a base station. For example, the base station may be an eNB or an eNodeB (evolved NodeB) in long term evolution (LTE). For another example, the base station may be a gNB, or the base station is a base station in a future communications system. In one embodiment, the network device may be an access node, a wireless relay node, a wireless backhaul node, or the like in a wireless local area network (wireless fidelity, Wi-Fi) system. In one embodiment, the network device may be a radio controller in a cloud radio access network (CRAN) scenario. In one embodiment, the network device may be a wearable device, a vehicle-mounted device, or the like. In one embodiment, the network device may be a small cell, a transmission node (transmission reception point, TRP), or the like. It may be understood that the base station may alternatively be a base station in a future evolved public land mobile network (PLMN), or the like. It may be understood that in this embodiment of this application, the network device may include a first network device and a second network device. The first network device may be understood as a source network device (for example, a source base station). The second network device may be understood as a target network device (for example, a target base station).

The terminal device may also be referred to as user equipment (UE), a terminal, or the like. The terminal device is a device having a wireless transceiver function. The terminal device may be deployed on land, and includes an indoor device, an outdoor device, a handheld device, a wearable device, or a vehicle-mounted device. The terminal device may alternatively be deployed on the water, for example, on a ship. The terminal device may alternatively be deployed in the air, for example, deployed on an airplane, a balloon, or a satellite. The terminal device may be a mobile phone, a tablet computer (Pad), a computer with a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. It may be understood that the terminal device may alternatively be a terminal device in a future 5G network, a terminal device in a future evolved PLMN, or the like.

In one embodiment, in the communications system shown in FIG. 1, the terminal device 1 and the terminal device 2 may further communicate by using a technology such as device to device (D2D), vehicle-to-everything (V2X) communication, or machine to machine (M2M). A communication method between the terminal device 1 and the terminal device 2 is not limited in this embodiment of this application. It may be understood that, in the communications system shown in FIG. 1, the network device and the terminal device 1 may be configured to perform a connection resume method provided in embodiments of this application, for example, may perform the method shown in any one of FIG. 2 to FIG. 7, and FIG. 13. In addition, the network device and the terminal device 2 may also be configured to perform a connection resume method provided in embodiments of this application, for example, may perform the method shown in any one of FIG. 2 to FIG. 7, and FIG. 13.

The 3GPP defines suspend and resume procedures of a terminal device. In a suspend phase, a base station A may send a resume identifier (resume ID) to UE. When the UE initiates a resume procedure, for example, the UE initiates a resume request to a base station B, the resume request carries the resume identifier and a resume message authentication code (MAC) value that is calculated by using a security context shared between the UE and the base station A. If the base station A and the base station B are a same base station, that is, a base station for performing a suspend procedure and a base station for the UE to perform a resume procedure are a same base station, the base station A verifies the resume MAC value. The base station B accepts the resume request of the UE after verification succeeds. If the base station A and the base station B are not a same base station, the base station B forwards, based on the resume identifier, the received resume MAC value to the base station A for verification. If verification succeeds, the base station B also accepts the resume request of the UE.

Calculation parameters of the foregoing resume MAC value include:

key: a shared key KRRont between the UE and the base station; and input parameters:

source cell radio network temporary identifier (source cell access radio network temporary, source C-RNTI), source cell radio network identifier (identifier), source physical cell identifier (source PCI), resume constant (resume constant), and target cell identifier (target cell-ID).

When the UE calculates the resume MAC value, in addition to the foregoing parameters, an additional parameter may be further introduced, for example, a resume cause value. Alternatively, an RRC resume request message is used as an input parameter to calculate the resume MAC value.

In one embodiment, in addition to the foregoing parameters, additional parameters may be further introduced, for example, a spare information bit (spare IE) and/or a channel quality indicator (CQI)-narrowband physical downlink control channel (NPDCCH). The CQI may be used to feed back a quality status of a channel. The NPDCCH may be a channel carrying control signaling, including information such as uplink and downlink scheduling grants and paging signaling. That is, the CQI-NPDCCH may be used to indicate a channel quality indicator of a narrowband physical downlink control channel.

In an example, there are two manners of calculating the resume MAC value.

Manner 1: The resume MAC value is calculated based on a first parameter set. The first parameter set includes a resume cause value and/or an RRC resume request message. For example, the first parameter set includes the resume cause value. Alternatively, the first parameter set includes all or a part of information in the RRC resume request message. Alternatively, the first parameter set includes the resume cause value and the RRC resume request message. That the first parameter set includes all of information in the RRC resume request message may be understood as a manner of calculating the resume MAC value is obtained by using the entire RRC resume request message as an input parameter. In other words, the entire RRC resume request message has integrity protection. It may be understood that the first parameter set may further include the shared key KRRont between the UE and the base station, and the input parameters such as the source cell radio network temporary identifier, the source cell radio network identifier, the source physical cell identifier, the resume constant, and the target cell identifier.

In other words, the first parameter set may include any one or more of the resume cause value, the spare information bit, and the CQI-NPDCCH; and/or the first parameter set includes all or a part of information in the RRC resume request message.

The RRC resume request message may include any one or more of the resume identifier (resume ID), the resume MAC value, the resume cause value, the spare information bit, or the CQI-NPDCCH.

In an example, the RRC resume request message includes the resume cause value and the CQI-NPDCCH. However, when the resume MAC value is calculated or generated, the resume cause value may be used as an input parameter to calculate the resume MAC value. Alternatively, the RRC resume request message includes the resume cause value, the spare information bit, and the CQI-NPDCCH. In this case, the resume cause value and the spare information bit may be used as input parameters to obtain the resume MAC value. Alternatively, the resume cause value and the CQI-NPDCCH are used as input parameters to obtain the resume MAC value. Alternatively, all of the information in the RRC resume request message is used as an input parameter to obtain the resume MAC value.

Manner 2: The resume MAC value is calculated based on a second parameter set. The second parameter set may include the shared key KRRont between the UE and the base station, and the input parameters such as the source cell radio network temporary identifier, the source cell radio network identifier, the source physical cell identifier, the resume constant, and the target cell identifier.

In this embodiment of this application, a parameter set is used by the UE to calculate the resume MAC value, and correspondingly, the base station also needs to use the parameter set to verify the resume MAC value. Therefore, the UE and the base station each may be classified into the following two types.

First-type UE: The first-type UE does not support introduction of an additional parameter (for example, the resume cause value or the RRC resume request message) to calculate the resume message authentication code MAC value. That is, the resume MAC value may be obtained by using the second parameter set. It may be understood that the first-type UE may also be referred to as type-A UE or the like. A name of a classification is not limited in this embodiment of this application.

Second-type UE: The second-type UE supports introduction of an additional parameter to calculate the resume MAC value. That is, the resume MAC value may be obtained by using the first parameter set. It may be understood that the second-type UE may also be referred to as type-B UE or the like.

If the UE supports obtaining of the resume MAC value by using the first parameter set, it may also be understood that the UE supports a resume message protection support feature (resume message protection support feature). Alternatively, it may be understood that the UE has a resume message protection support feature. In one embodiment, the resume message protection support feature may also be used as a capability of the UE. For example, when the UE reports capability information to the network device, the UE may also report whether the UE supports a capability of the resume message protection support feature. In one embodiment, that the UE obtains (or calculates) the resume MAC value based on the first parameter set may also be understood as: The UE activates the resume message protection support feature.

First-type base station: The first-type base station does not support verification of the resume MAC value calculated by introducing an additional parameter. That is, the first-type base station does not support verification of the resume MAC value obtained by using the first parameter set. It may be understood that the first-type base station may also be referred to as a type-A base station or the like.

Second-type base station: The second-type base station supports verification of the resume MAC value calculated by introducing an additional parameter. That is, the second-type base station supports verification of the resume MAC value obtained by using the first parameter set. It may be understood that the second-type base station may also be referred to as a type-B base station or the like.

If the network device supports verification of the resume MAC value by using the first parameter set, it may be understood that the network device supports a resume message protection support feature, it may be understood that the network device has a resume message protection support feature, or it may be understood that the network device has a RAN resume message protection support feature. In one embodiment, that the network device verifies the resume MAC value based on the first parameter set may also be understood as: The network device activates the (RAN) resume message protection support feature.

Alternatively, a feature that supports calculation of the resume MAC value by using an additional parameter is referred to as a feature 1, that is, the feature supported by the second-type UE. A feature that supports verification of the resume MAC value calculated by using an additional parameter is referred to as a feature 2, that is, the feature supported by the second-type of base station.

It should be noted that, the second-type UE supports obtaining of the resume MAC value by using the first parameter set, and also supports obtaining of the resume MAC value by using the second parameter set. Similarly, the second-type base station supports verification of the resume MAC value obtained by using the first parameter set, and also supports verification of the resume MAC value obtained by using the second parameter set. It may be understood that, for ease of description, when the connection resume method provided in embodiments of this application is described, the type-A UE, the type-B UE, the type-A base station, and the type-B base station are used as examples for description.

In the communications system, there may be the first-type UE, the second-type UE, the first-type base station, and the second-type base station. Therefore, there may be a case in which the second-type UE does not know whether a base station connected to the UE is the first-type base station or the second-type base station. As a result, it cannot be determined which manner is used to calculate the resume MAC value. Similarly, the second-type base station does not know whether the UE is the first-type UE or the second-type UE, either. As a result, it cannot be determined which manner is used to verify the received resume MAC value.

Therefore, embodiments of this application provide a connection resume method, so that the base station and the UE can determine, through negotiation, how to calculate the resume MAC value. Details are as follows.

Embodiment 1

FIG. 2 shows a connection resume method according to an embodiment of this application. The method may be applied to the communications system shown in FIG. 1. As shown in FIG. 2, the method includes the following operations.

201: UE sends a first message that carries first indication information to a source base station, where the first indication information may be used to indicate to calculate a resume MAC value based on a first parameter set. The source base station receives the first message that carries the first indication information.

In this embodiment of this application, the first message may be a protected RRC message. For example, the first message may be an access stratum (AS) security mode complete message, a terminal device capability information (UE capability information) message, or the like. A type of the first message is not limited in this embodiment of this application. The first indication information is used to indicate to calculate the resume MAC value based on the first parameter set. Alternatively, the first indication information may be further understood as: The first indication information is used to indicate that the UE is type-B UE, or is used to indicate that the UE supports a feature 1, or is used to indicate the base station to verify the resume MAC value by using a feature 2.

202: If the source base station supports verification of the resume MAC value obtained by using the first parameter set, the source base station sends a second message that carries second indication information to the UE, where the second indication information may be used to indicate to verify the resume MAC value based on the first parameter set. The UE receives the second message that carries the second indication information.

In an example, the second message may be an RRC release message, a broadcast message, or the like. This is not limited in this embodiment of this application. For example, the broadcast message may include a system information block (SIB), a master information block (MIB), or the like. Alternatively, the second indication information may be further understood as: The second indication information is used to indicate that the base station is a type-B base station, or is used to indicate that the base station supports the feature 2, or is used to indicate the UE to protect a resume request message by using the feature 1.

In this embodiment of this application, through interaction between the source base station and the UE, the UE may protect an RRC resume request message in a manner indicated by the source base station, and the source base station may also verify the RRC resume request message in a manner indicated by the UE. The UE obtains the resume MAC value by using the first parameter set, and the resume MAC value is included in the RRC resume request message. In this way, the RRC resume request message is protected.

According to the method shown in FIG. 2, security negotiation may be performed between the UE and the base station, to perform an operation related to the resume MAC value, for example, RRC connection resume. When the UE receives the second message that carries the second indication information, the UE sends the RRC resume request message that carries the resume MAC value to a target base station. The second indication information may be used to indicate to verify the resume MAC value based on the first parameter set.

It may be understood that, in this embodiment of this application, operations that may be performed based on the resume MAC value are limited.

In some embodiments of this application, FIG. 3 is a schematic flowchart of a connection resume method according to an embodiment of this application. The method may be applied to the communications system shown in FIG. 1. As shown in FIG. 3, the method includes the following operations.

301: UE sends a first message that carries first indication information to a source base station, where the first indication information may be used to indicate to calculate a resume MAC value based on a first parameter set. The source base station receives the first message that carries the first indication information.

302: If the source base station supports verification of the resume MAC value calculated by using the first parameter set, the source base station sends a second message that carries second indication information to the UE, where the second indication information may be used to indicate to verify the resume MAC value based on the first parameter set. The UE receives the second message that carries the second indication information.

It may be understood that for embodiments of 301 and 302, refer to the method shown in FIG. 2. Details are not described herein one by one.

It may be understood that, if the source base station does not support verification of the resume MAC value calculated by using the first parameter set, an RRC release message sent by the source base station to the UE may not include the second indication information. In this way, the UE may calculate the resume MAC value by using a second parameter set, and the source base station verifies, by using the second parameter set, the resume MAC value calculated by the UE by using the second parameter set.

303: The UE calculates the resume MAC value in a manner indicated by the second indication information. In one embodiment, the UE calculates the resume MAC value based on the first parameter set.

That the UE calculates the resume MAC value in a manner indicated by the second indication information may also be understood as: The UE activates a resume message protection support feature of the UE. It may be understood that the description is applicable to all the following embodiments.

304: The UE sends an RRC resume request message that carries the resume MAC value to a target base station. The target base station receives the RRC resume request message that carries the MAC value.

In this embodiment of this application, because the target base station may not have a UE context, when receiving the RRC resume request message that carries the MAC value, the target base station may fail to verify the MAC value. Therefore, the method shown in FIG. 2 may further include the following methods.

305: The target base station sends a retrieve UE context request message that carries the resume MAC value to the source base station. The source base station receives the retrieve UE context request message that carries the resume MAC value.

It may be understood that the RRC resume request message further carries a resume ID. The target base station may learn, based on the resume ID, which base station is the source base station.

In one embodiment, the retrieve UE context request message may further carry all or a part of information in the RRC resume request message. For example, the source base station may verify the resume MAC value based on the entire RRC resume request message. Alternatively, it may be understood that the source base station may activate a resume message protection support feature of the source base station based on the RRC resume request message. For another example, the retrieve UE context request message may further carry a resume cause value. For another example, the retrieve UE context request message may further carry a spare information bit (spare IE) and/or a CQI-MPDCCH. Any one or more parameters of the resume cause value, the spare information bit, or the CQI-NPDCCH are carried, so that the source base station may learn, when receiving a parameter in the retrieve UE context request message, to verify the resume MAC value based on the resume message protection support feature.

In one embodiment, the retrieve UE context request message may further carry tenth indication information. The tenth indication information may be used to indicate the source base station to activate the resume message protection support feature.

306: The source base station verifies the resume MAC value in a manner indicated by the first indication information, and in one embodiment, verifies the resume MAC value by using the first parameter set, and sends the UE context to the target base station after verification succeeds.

In this embodiment of this application, that the source base station verifies the resume MAC value by using the first parameter set may be understood as: The source base station verifies the resume MAC value in the manner indicated by the first indication information.

That the source base station verifies the resume MAC value in a manner indicated by the first indication information may also be understood as: The source base station activates the resume message protection support feature of the source base station. It may be understood that the description is applicable to all the following embodiments.

307: The target base station receives the UE context, and resumes an RRC connection to the UE.

It may be understood that, in this embodiment of this application, if the UE sends the RRC resume request message that carries the resume MAC value to the source base station, the source base station may send the UE context to the target base station after verification of the resume MAC value succeeds. In this way, the target base station resumes the RRC connection to the UE.

In this embodiment of this application, a terminal device interacts with a first terminal device, so that the terminal device can learn whether the first network device supports verification of a resume MAC value calculated by using an additional parameter (that is, a resume cause value or an RRC resume request message), and the first network device can learn whether the terminal device supports calculation of the resume MAC value by introducing the additional parameter. In this way, the terminal device can protect the RRC resume request message in an appropriate manner, and the first network device can verify the RRC resume request message in an appropriate manner.

Embodiment 2

FIG. 4 is a schematic flowchart of a connection resume method according to an embodiment of this application. The method may be applied to the communications system shown in FIG. 1. As shown in FIG. 4, the method includes the following operations.

401: A source base station sends an RRC release message that carries second indication information to a terminal device, where the second indication information is used to indicate that verification of a resume MAC value based on a first parameter set is supported. The terminal device receives the RRC release message that carries the second indication information.

In this embodiment of this application, the first parameter set includes one or more of a resume cause value or a radio resource control RRC resume request message. For descriptions of the first parameter set, refer to the foregoing embodiment. Details are not described herein one by one.

It may be understood that the foregoing 401 may alternatively be: The source base station sends a broadcast message that carries the second indication information to the terminal device, where the second indication information is used to indicate that verification of the resume MAC value based on the first parameter set is supported. The terminal device receives the broadcast message that carries the second indication information. That is, the RRC release message may be replaced with the broadcast message. The broadcast message may be an MIB, an SIB, or the like.

402: The terminal device calculates the resume MAC value in a manner indicated by the second indication information. In one embodiment, UE calculates the resume MAC value based on the first parameter set.

403: The terminal device sends an RRC resume request message that carries first indication information and the resume MAC value to a target base station. The target base station receives the RRC resume request message that carries the first indication information and the resume MAC value.

In this embodiment of this application, the first indication information may be carried in an unused bit in the RRC resume request message. Alternatively, the first indication information may be carried in an unused bit in a field of the resume cause value in the RRC resume request message. Alternatively, the first indication information may be carried in a newly added bit in the RRC resume request message, or the like.

404: The target base station sends a retrieve UE context request message that carries the resume MAC value and the first indication information to the source base station. The source base station receives the retrieve UE context request message that carries the resume MAC value and the first indication information.

In one embodiment, operation 404 may be alternatively replaced with the following: The target base station sends a retrieve UE context request message that carries the RRC resume request message and the first indication information to the source base station. The source base station receives the retrieve UE context request message that carries the resume MAC value and the first indication information. Therefore, after receiving the retrieve UE context request message that carries the RRC resume request message, the source base station may learn to verify the resume MAC value based on the resume cause value and/or the RRC resume request message.

405: The source base station verifies the resume MAC value in a manner indicated by the first indication information, and in one embodiment, verifies the resume MAC value by using the first parameter set, and sends a UE context to the target base station after verification succeeds.

406: The target base station receives the UE context, and resumes an RRC connection to the UE.

Embodiment 3

Figure 5:
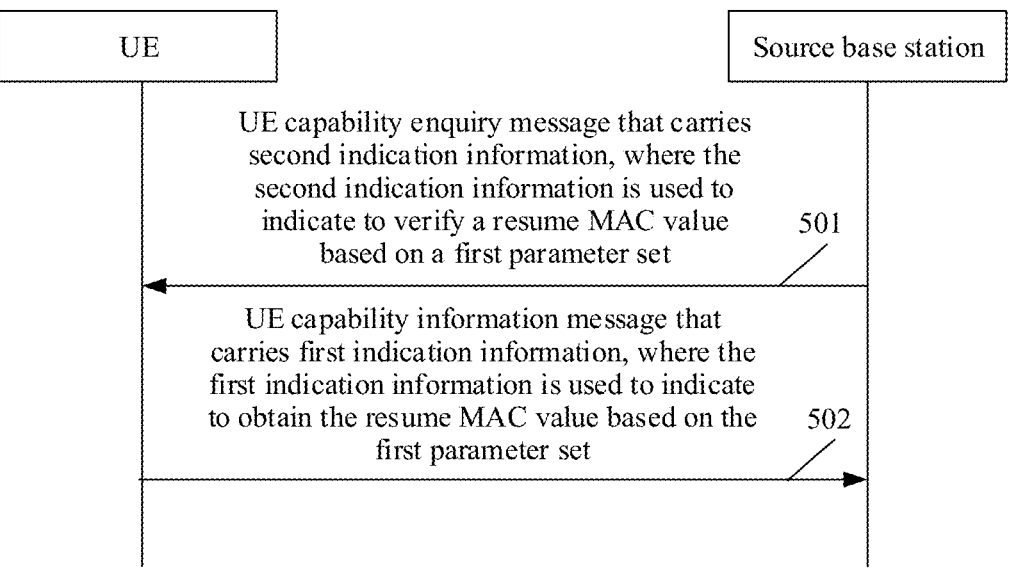
FIG. 5 is a schematic flowchart of a connection resume method according to an embodiment of this application.

FIG. 5 shows a connection resume method according to an embodiment of this application. The method may be applied to the communications system shown in FIG. 1. As shown in FIG. 5, the method includes the following operations.

501: A source base station sends a UE capability enquiry message that carries second indication information to UE. The UE receives the UE capability enquiry message that carries the second indication information. The second indication information is used to indicate to verify a resume MAC value based on a first parameter set. The first parameter set includes one or more of a resume cause value or an RRC resume request message.

502: The UE sends a UE capability information message that carries first indication information to the source base station. The source base station receives the UE capability information message that carries the first indication information. The first indication information is used to indicate to obtain the resume MAC value based on the first parameter set.

By sending the UE capability enquiry message that carries the second indication information to the UE, the source base station may indicate to the UE that the source base station supports verification of the resume AMC value by using the first parameter set, to indicate to the UE that the source base station supports a capability of verifying the RRC resume request message by using the first parameter set. In one embodiment, if the UE also supports calculation of the resume MAC value by using the first parameter set, the UE may send the UE capability information that carries the first indication information to the source base station, to indicate that the UE supports calculation of the resume MAC value by using the first parameter set, so as to implement a capability of protecting the RRC resume request message. In one embodiment, if the UE does not support calculation of the resume MAC value by using the first parameter set, the UE may not feed back the UE capability information message that carries the first indication information to the source base station. In this way, the source base station may learn that the UE does not support calculation of the resume MAC value by using the first parameter set.

Figure 6:
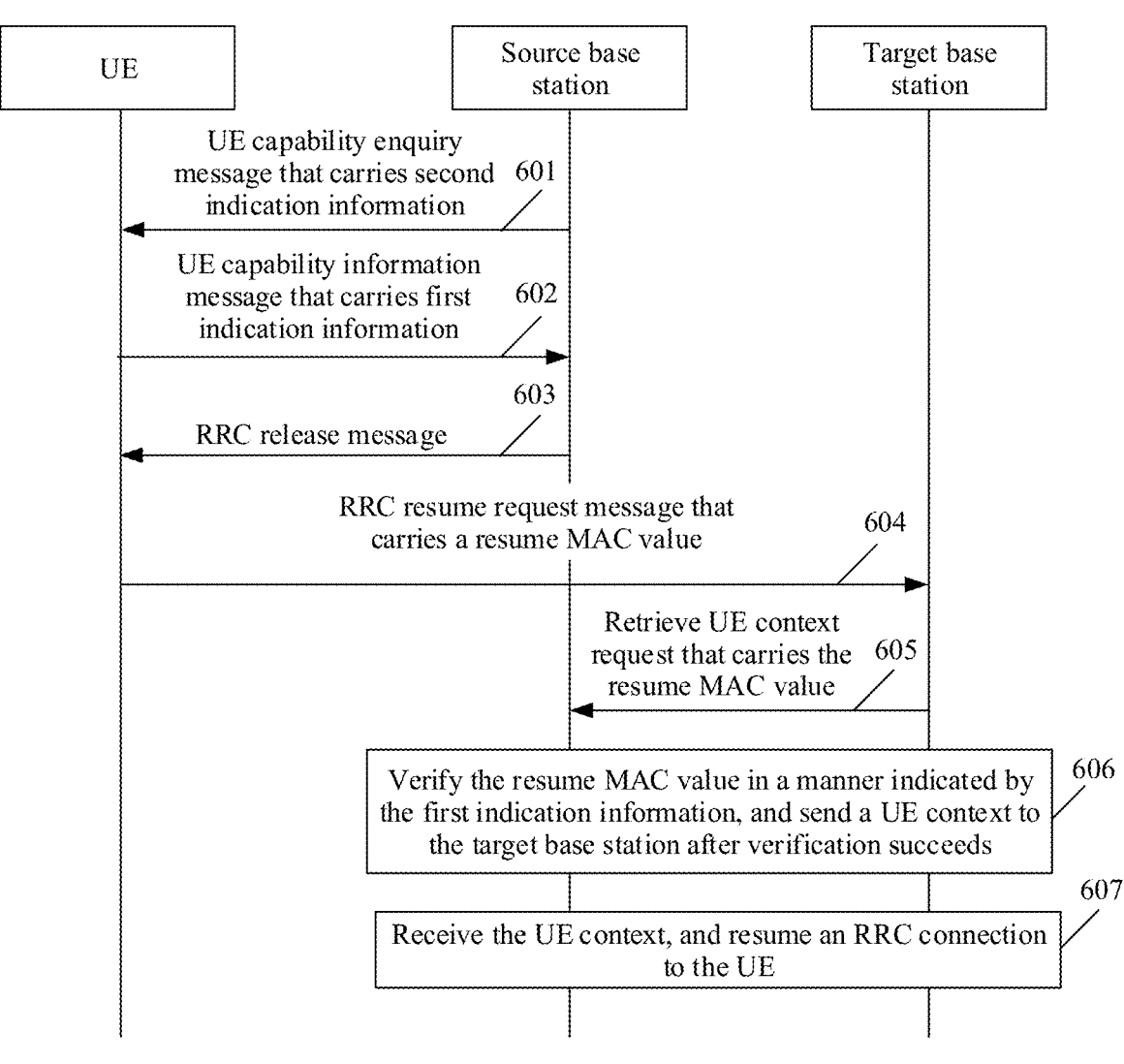
FIG. 6 is a schematic flowchart of a connection resume method according to an embodiment of this application.

In some embodiments of this application, based on the method shown in FIG. 5, FIG. 6 is a schematic flowchart of a connection resume method according to an embodiment of this application. As shown in FIG. 6, the method includes the following operations.

For embodiments of 601 and 602, refer to the method shown in FIG. 5. Details are not described herein.

603: A source base station sends an RRC release message to UE. In one embodiment, the RRC release message may carry second indication information. The UE receives the RRC release message.

604: The UE sends an RRC resume request message that carries a resume MAC value to a target base station. The target base station receives the RRC resume request message that carries the resume MAC value.

605: The target base station sends a retrieve UE context request message that carries the resume MAC value to the source base station. The source base station receives the retrieve UE context request message that carries the resume MAC value.

606: The source base station verifies the resume MAC value in a manner indicated by first indication information, and in one embodiment, verifies the resume MAC value by using a first parameter set, and sends a UE context to the target base station after verification succeeds.

607: The target base station receives the UE context, and resumes an RRC connection to the UE.

In this embodiment of this application, through interaction between the source base station and the UE, the UE may protect the RRC resume request message in a manner indicated by the source base station, and the source base station may also verify the RRC resume request message in a manner indicated by the UE. The UE obtains the resume MAC value by using the first parameter set, and the resume MAC value is included in the RRC resume request message. In this way, the RRC resume request message is protected.

Embodiment 4

Figure 7:
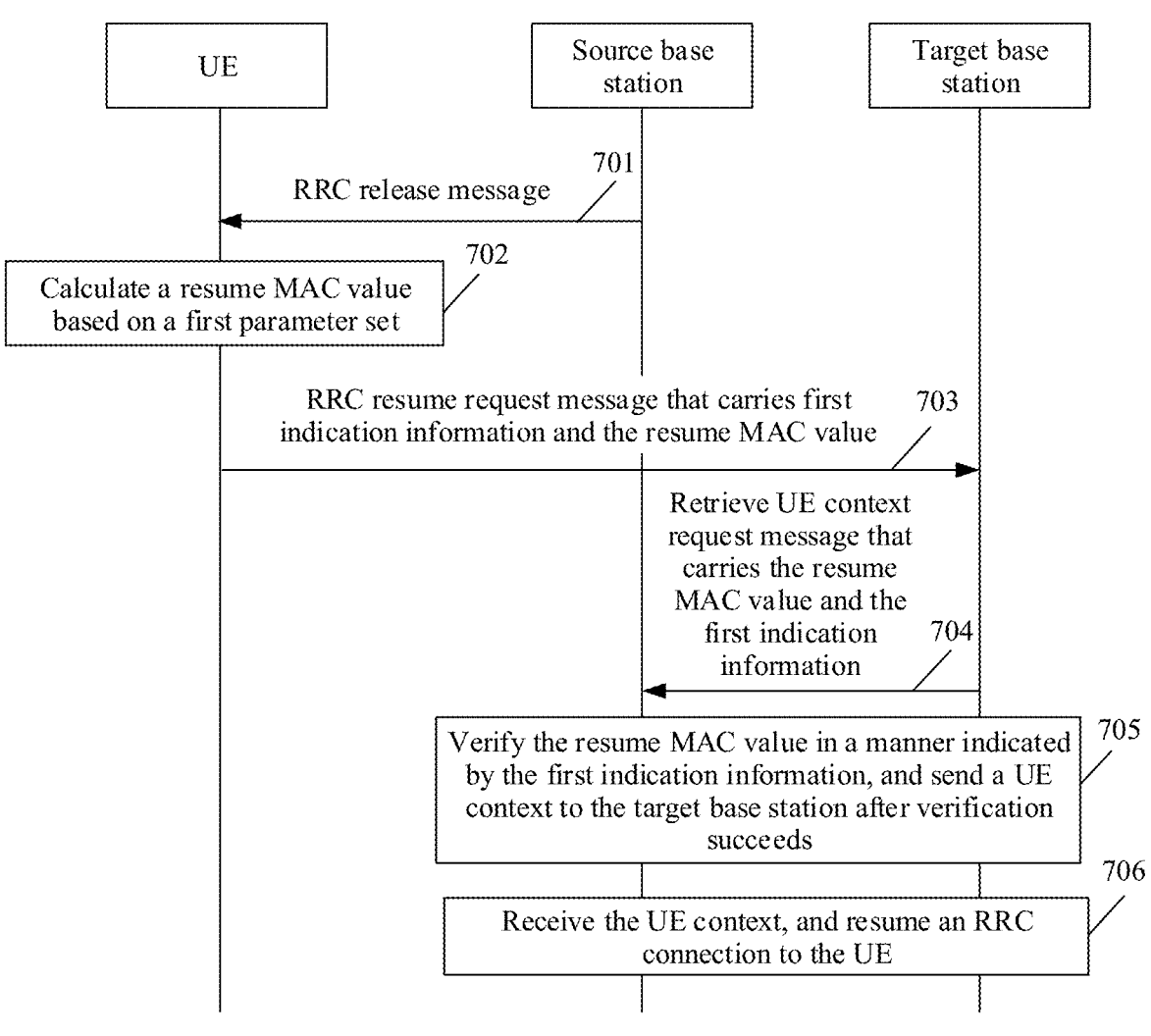
FIG. 7 is a schematic flowchart of a connection resume method according to an embodiment of this application.

FIG. 7 is a schematic flowchart of a connection resume method according to an embodiment of this application. The method may be applied to the communications system shown in FIG. 1. As shown in FIG. 7, the method includes the following operations.

701: A source base station sends an RRC release message to UE. The UE receives the RRC release message.

702: The UE calculates a resume MAC value based on a first parameter set.

703: The UE sends an RRC resume request message that carries first indication information and the resume MAC value to a target base station. The target base station receives the RRC resume request message that carries the first indication information and the resume MAC value.

704: The target base station sends a retrieve UE context request message that carries the first indication information and the resume MAC value to the source base station. The source base station receives the retrieve UE context request message that carries the first indication information and the resume MAC value.

705: The source base station verifies the resume MAC value in a manner indicated by the first indication information, and in one embodiment, verifies the resume MAC value by using the first parameter set, and sends a UE context to the target base station after verification succeeds.

In this embodiment of this application, that the source base station verifies the resume MAC value by using the first parameter set may be understood as: The source base station verifies the resume MAC value in the manner indicated by the first indication information.

706: The target base station receives the UE context, and resumes an RRC connection to the UE.

In this embodiment of this application, the UE supports calculation of the resume MAC value based on the first parameter set. The source base station supports verification of the resume MAC value based on the first parameter set. In this case, the UE may also support calculation of the resume MAC value based on a second parameter set. The source base station may also support verification of the resume MAC value based on the second parameter set. In this way, to enable the source base station to effectively obtain a verification manner, the UE may directly use the RRC resume request message to carry the first indication information, to indicate the verification manner of the resume MAC value to the source base station, for example, a manner of verifying the resume MAC value by using the first parameter set. This improves verification efficiency of the source base station.

Embodiment 5

Figure 13:
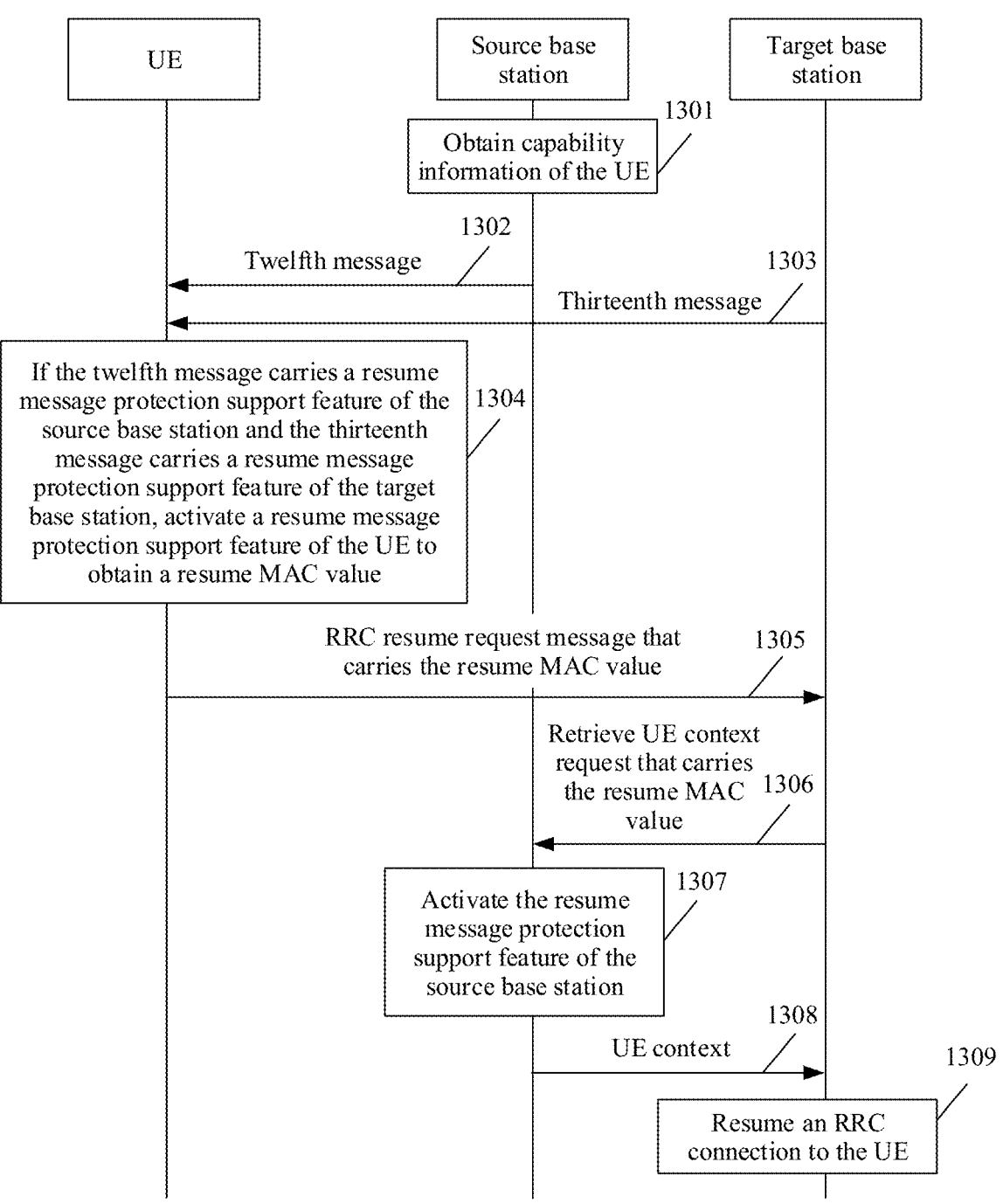
FIG. 13 is a schematic flowchart of a connection resume method according to an embodiment of this application.

FIG. 13 shows a connection resume method according to an embodiment of this application. The method may be applied to the communications system shown in FIG. 1. As shown in FIG. 13, the method includes the following operations.

1301: A source base station obtains capability information of UE.

In one embodiment, that a source base station obtains capability information of UE may include:

The UE reports the capability information to the source base station, where the capability information carries a resume message protection support feature of the UE.

Alternatively, the source base station obtains the capability information of the UE from a core network device.

Before the UE reports the capability information to the source base station, the source base station may further send a UE capability enquiry message to the UE.

The source base station obtains the capability information of the UE from the core network device. For example, during initial access of the UE, the capability information of the UE may be reported to a base station initially accessed by the UE, so that the initially base station accessed by the UE may send the capability information of the UE to the core network device. In this way, the core network device stores the capability information of the UE. If the source base station is the base station initially accessed by the UE, the source base station obtains the capability information of the UE in a manner of reporting the capability information by the UE.

The foregoing description of carrying the resume message protection support feature of the UE may be further understood as: The capability information carries information that is used to indicate the resume message protection support feature of the UE.

1302: The source base station sends a twelfth message to the UE. Correspondingly, the UE receives the twelfth message from the source base station.

1303: A target base station sends a thirteenth message to the UE. Correspondingly, the UE receives the thirteenth message from the target base station.

1304: If the twelfth message carries a resume message protection support feature of the source base station and the thirteenth message carries a resume message protection support feature of the target base station, the UE activates the resume message protection support feature of the UE to obtain a resume MAC value.

That the UE activates the resume message protection support feature may be understood as: The UE obtains the resume MAC value based on a first parameter set. For descriptions of the first parameter set, refer to the foregoing embodiment.

In one embodiment, the twelfth message may be, for example, a broadcast message or an RRC release message. The thirteenth message may be, for example, a broadcast message or another downlink RRC message. For a message type, refer to the foregoing embodiment. Details are not described herein again. It may be understood that, if the twelfth message is not an RRC release message, before the target base station sends the thirteenth message to the UE, the source base station may further send the RRC release message to the UE. For descriptions of the twelfth message and the thirteenth message, correspondingly, refer to the descriptions of the second message.

1305: The UE sends an RRC resume request message that carries the resume MAC value to the target base station. Correspondingly, the target base station receives the RRC resume request message.

1306: The target base station sends a retrieve UE context request message that carries the resume MAC value to the source base station. Correspondingly, the source base station receives the retrieve UE context request message.

In one embodiment, the retrieve UE context request message may further carry a third parameter set. The third parameter set may include all or a part of information in the RRC resume request message. For example, the source base station may verify the resume MAC value based on the entire RRC resume request message. Alternatively, it may be understood that the source base station may activate the resume message protection support feature of the source base station based on the RRC resume request message. For another example, the retrieve UE context request message may further carry a resume cause value. For another example, the retrieve UE context request message may further carry a spare information bit (spare IE) and/or a CQI-MPDCCH. Any one or more parameters of the resume cause value, the spare information bit, or the CQI-NPDCCH are carried, so that the source base station may learn, when receiving a parameter in the retrieve UE context request message, to verify the resume MAC value based on the resume message protection support feature.

In one embodiment, the retrieve UE context request message may further carry tenth indication information. The tenth indication information may be used to indicate the source base station to activate the resume message protection support feature.

1307: The source base station activates the resume message protection support feature of the source base station, and verifies the resume MAC value. Further, the source base station may verify the resume MAC value based on the first parameter set.

1308: The source base station sends a UE context to the target base station, and the target base station receives the UE context.

1309: The target base station resumes an RRC connection to the UE.

It may be understood that the foregoing embodiments are described by using an example in which a first network device is the source base station and a second network device is the target base station. However, in one embodiment, when sending the RRC resume request message, the UE may further send the RRC resume request message to the source base station. In one embodiment, when the UE sends the RRC resume request message that carries the resume MAC value to the source base station, the source base station may directly verify the resume MAC value based on the first parameter set. For example, operations 304 to 307 in FIG. 3 may be replaced with the following: The UE sends an RRC resume request message that carries the resume MAC value to the source base station. The source base station receives the RRC resume request message that carries the resume MAC value, verifies the resume MAC value in a manner indicated by the first indication information, and resumes an RRC connection to the UE after verification succeeds. For another example, operations 403 to 406 in FIG. 4 may be replaced with the following: The UE sends an RRC resume request message that carries first indication information and the resume MAC value to the source base station. The source base station receives the RRC resume request message that carries the first indication information and the resume MAC value, verifies the resume MAC value in a manner indicated by the first indication information, and resumes an RRC connection to the UE after verification succeeds. Similarly, the methods shown in FIG. 6 and FIG. 7 may also be as shown above. Details are not described herein again.

It may be understood that the foregoing embodiments have their own emphasis. For an implementation that is not described in detail in one embodiment, refer to another embodiment. Details are not described herein one by one. Further, embodiments described in this specification may be independent solutions, or may be combined based on internal logic. These solutions all fall within the protection scope of this application.

It may be understood that in the foregoing method embodiments, the methods and operations implemented by the terminal device may alternatively be implemented by a component (for example, a chip or a circuit) that can be used in the terminal device. The methods and operations implemented by the network device (including the first network device and the second network device) may alternatively be implemented by a component (for example, a chip or a circuit) of the network device.

A communications apparatus provided in embodiments of this application is described in detail below.

Figure 8:
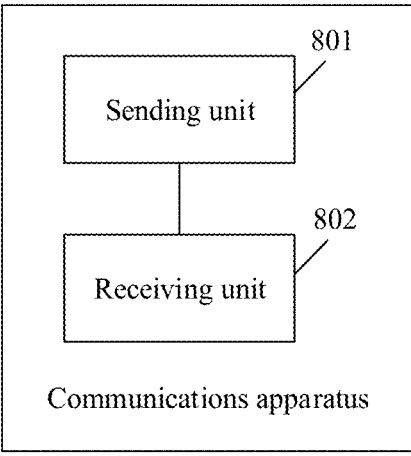
FIG. 8 is a schematic diagram of a structure of a communications apparatus according to an embodiment of this application.

FIG. 8 is a schematic diagram of a structure of a communications apparatus according to an embodiment of this application. The communications apparatus may be a terminal device, or may be a chip. The communications apparatus is configured to perform the method described in embodiments of this application. As shown in FIG. 8, the communications apparatus includes:

a sending unit 801, configured to send a first message that carries first indication information to a first network device, where the first indication information is used to indicate to calculate a resume message authentication code (MAC) value based on a first parameter set, and the first parameter set includes one or more of a resume cause value or a radio resource control (RRC) resume request message; and a receiving unit 802, configured to receive a second message from the first network device.

The sending unit 801 is further configured to: when second message carries second indication information, the terminal device sends an RRC resume request message that carries the resume MAC value to a second network device, where the second indication information is used to indicate to verify the resume MAC value based on the first parameter set.

In one embodiment, the first message is an access stratum (AS) security mode complete message, or the first message is a terminal device capability information message.

In one embodiment, the second message is an RRC release message, or the second message is a broadcast message.

It should be understood that when the communications apparatus is a terminal device or a component that implements the foregoing functions in the terminal device, the communications apparatus may further include a processing unit, which is not shown in FIG. 8. The processing unit may be one or more processors. The sending unit 801 may be a transmitter. The receiving unit 802 may be a receiver. Alternatively, the sending unit 801 and the receiving unit 802 are integrated into one component, for example, a transceiver.

When the communications apparatus is a chip, the processing unit may be one or more processors. The sending unit 801 may be an output interface. The receiving unit 802 may be an input interface. Alternatively, the sending unit 801 and the receiving unit 802 are integrated into one unit, for example, an input/output interface, and the input/output interface is also referred to as a communications interface, an interface circuit, an interface, or the like.

It may be understood that, for implementation of the units shown in FIG. 8, refer to corresponding descriptions in the foregoing embodiment. For example, the units shown in FIG. 8 may be further configured to perform operations performed by the terminal device in any one of the method embodiments shown in FIG. 2 to FIG. 7, and FIG. 13. Details are not described herein one by one.

Figure 9:
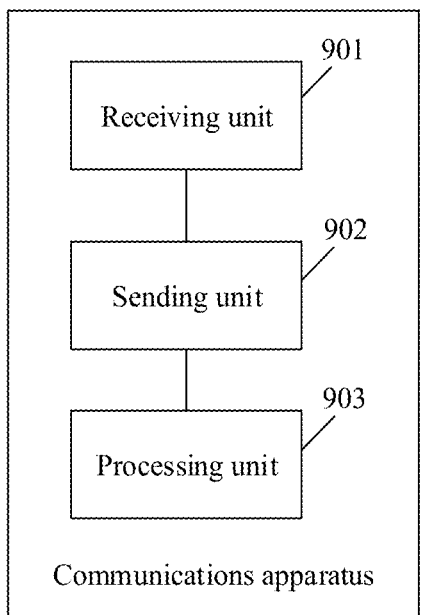
FIG. 9 is a schematic diagram of a structure of a communications apparatus according to an embodiment of this application.

FIG. 9 is a schematic diagram of a structure of a communications apparatus according to an embodiment of this application. The communications apparatus may be a first network device, or may be a chip. The communications apparatus is configured to perform the method described in embodiments of this application. As shown in FIG. 9, the communications apparatus includes:

a receiving unit 901, configured to receive a first message that is from a terminal device and that carries first indication information, where the first indication information is used to indicate to calculate a resume message authentication code (MAC) value based on a first parameter set, and the first parameter set includes one or more of a resume cause value or a radio resource control (RRC) resume request message; and a sending unit 902 is configured to send a second message that carries second indication information to the terminal device, where the second indication information is used to indicate to verify the resume MAC value based on the first parameter set.

In one embodiment, the receiving unit 801 is further configured to receive a retrieve UE context request message that carries the resume MAC value.

The apparatus further includes a processing unit 903. The processing unit 903 is configured to verify the resume MAC value based on the first parameter set.

In one embodiment, the first message is an access stratum (AS) security mode complete message, or the first message is a terminal device capability information message.

In one embodiment, the second message is an RRC release message, or the second message is a broadcast message.

It should be understood that, when the communications apparatus is a first network device or a component that implements the foregoing functions in the first network device. The processing unit 903 may be one or more processors. The sending unit 902 may be a transmitter. The receiving unit 901 may be a receiver. Alternatively, the sending unit 902 and the receiving unit 901 are integrated into one component, for example, a transceiver.

When the communications apparatus is a chip, the processing unit 903 may be one or more processors. The sending unit 902 may be an output interface. The receiving unit 901 may be an input interface. Alternatively, the sending unit 902 and the receiving unit 901 are integrated into one unit, for example, an input/output interface, and the input/output interface is also referred to as a communications interface, an interface circuit, an interface, or the like.

It may be understood that, for implementation of the units shown in FIG. 9, refer to corresponding descriptions in the foregoing embodiment. For example, the units shown in FIG. 9 may be further configured to perform operations performed by the first network device in any one of the method embodiments shown in FIG. 2 to FIG. 7, and FIG. 13. Details are not described herein one by one.

Figure 10:
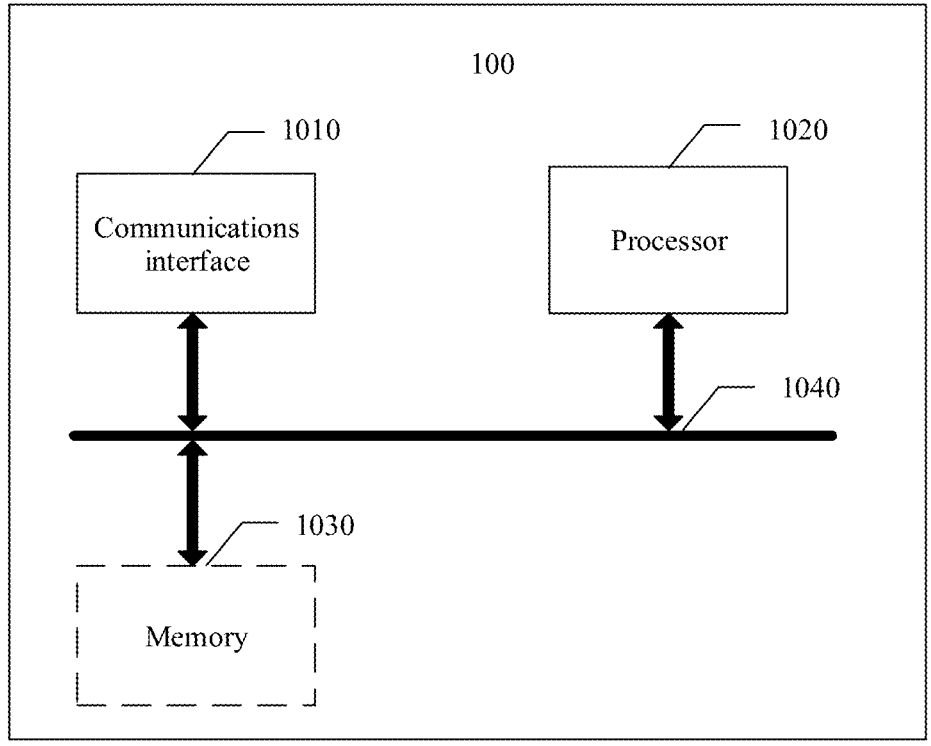
FIG. 10 is a schematic diagram of a structure of a terminal device according to an embodiment of this application.

FIG. 10 shows a communications apparatus 100 according to an embodiment of this application. The communications apparatus 100 is configured to implement functions of the terminal device in the foregoing method. When implementing the functions of the terminal device, the apparatus may be a terminal device, or may be an apparatus in a terminal device, or an apparatus that can be used together with a terminal device. The apparatus may alternatively be a chip system. In this embodiment of this application, the chip system may include a chip, or may include a chip and another discrete component. The apparatus 100 includes at least one processor 1020, configured to implement the functions of the terminal device in the method provided in embodiments of this application. The apparatus 100 may further include a communications interface 1010. In this embodiment of this application, the communications interface may be a transceiver, a circuit, a bus, a module, or a communications interface of another type, and is configured to communicate with another device through a transmission medium. For example, the communications interface 1010 is used for an apparatus in the apparatus 100 to communicate with another device. The processor 1020 receives and sends data through the communications interface 1010, and is configured to implement the method in the foregoing method embodiment. For example, the communications interface 1010 may be configured to perform the methods shown in FIG. 2 and FIG. 5. For another example, the communications interface 1010 may be further configured to perform the method shown in 301 and 302 in FIG. 3, may be further configured to perform the method shown in 401 in FIG. 4, may be further configured to perform the method shown in 601 to 604 in FIG. 6, and may be further configured to perform the method shown in 701 and 703 in FIG. 7.

For example, the processor 1020 may be further configured to perform the corresponding methods shown in FIG. 3, FIG. 4, FIG. 6, FIG. 7, and FIG. 13. For example, the processor 1020 may be configured to perform the method shown in 303 in FIG. 3. For another example, the processor 1020 may be further configured to perform the method shown in 402 in FIG. 4. Details are not described herein one by one.

The apparatus 100 may further include at least one memory 1030, configured to store program instructions and/or data. The memory 1030 is coupled to the processor 1020. Coupling in this embodiment of this application is indirect coupling or a communication connection between apparatuses, units, or modules, may be in electrical, mechanical, or other forms, and is used for information exchange between the apparatuses, the units, and the modules. The processor 1020 may cooperate with the memory 1030. The processor 1020 may execute the program instructions stored in the memory 1030. At least one of the at least one memory may be included in the processor.

A connection medium between the communications interface 1010, the processor 1020, and the memory 1030 is not limited in this embodiment of this application. In this embodiment of this application, the memory 1030, the processor 1020, and the communications interface 1010 are connected through a bus 1040 in FIG. 10. The bus is indicated by using a bold line in FIG. 10. A connection manner between other components is merely an example for description, and is not limited thereto. The bus may be classified into an address bus, a data bus, a control bus, and the like. For ease of representation, only one bold line is used to indicate the bus in FIG. 10, but this does not mean that there is only one bus or only one type of bus.

When the apparatus 100 is a chip or a chip system, the communications interface 1010 may output or receive a baseband signal. When the apparatus 100 is a device, the communications interface 1010 may output or receive a radio frequency signal. In this embodiment of this application, the processor may be a general-purpose processor, a digital signal processor, an application-specific integrated circuit, a field programmable gate array or another programmable logic device, a discrete gate or transistor logic device, or a discrete hardware component. The processor can implement or execute the methods, operations, and logical block diagrams disclosed in embodiments of this application. The general-purpose processor may be a microprocessor or any conventional processor or the like. The operations of the methods disclosed with reference to embodiments of this application may be directly performed and completed by a hardware processor, or may be performed and completed by using a combination of hardware and software modules in the processor.

Figure 11:
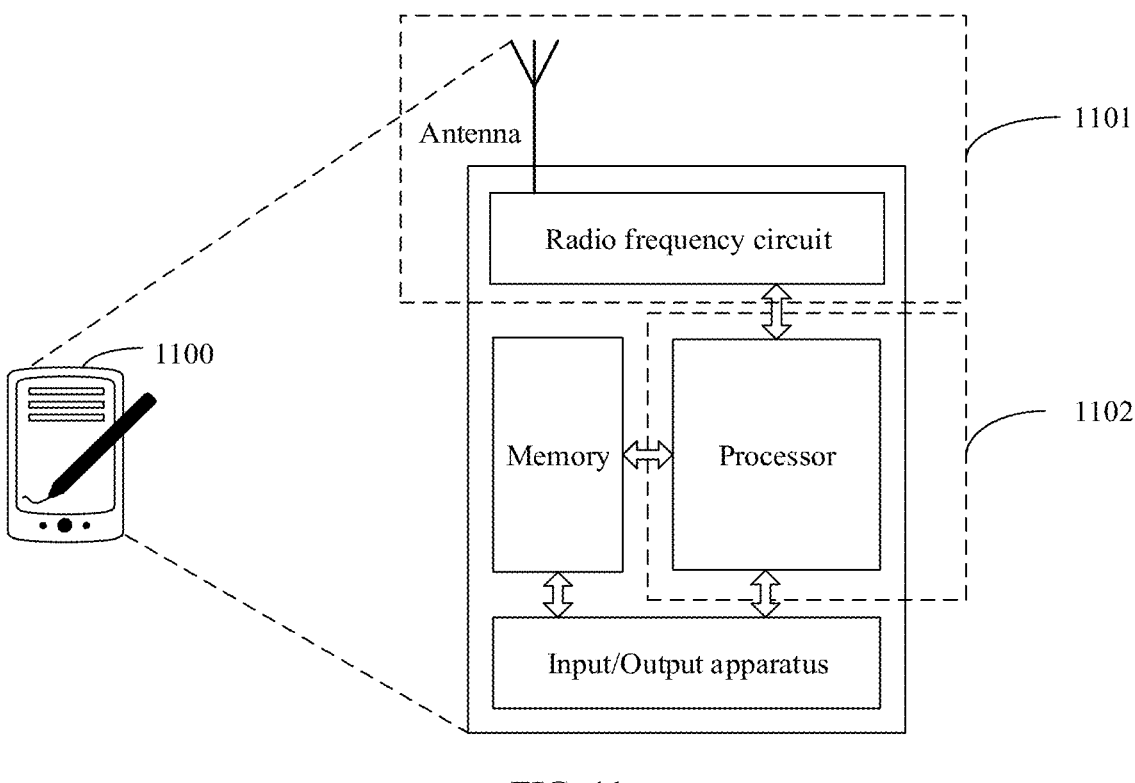
FIG. 11 is a schematic diagram of a structure of a terminal device according to an embodiment of this application.

In an example, FIG. 11 is a schematic diagram of a structure of a terminal device 1100 according to an embodiment of this application. The terminal device may perform the methods shown in FIG. 2 to FIG. 7, and FIG. 13, or the terminal device may perform the operations of the terminal device shown in FIG. 8.

For ease of description, FIG. 11 shows only main components of the terminal device. As shown in FIG. 11, the terminal device 1100 includes a processor, a memory, a radio frequency circuit, an antenna, and an input/output apparatus.

The processor is mainly configured to process a communications protocol and communications data, control the entire terminal device, execute a software program, and process data of the software program, for example, configured to support the terminal device in performing the procedures described in FIG. 2 to FIG. 7, and FIG. 13. The memory is mainly configured to store the software program and the data. The radio frequency circuit is mainly configured to perform conversion between a baseband signal and a radio frequency signal, and process the radio frequency signal. The antenna is mainly configured to receive and send the radio frequency signal in a form of an electromagnetic wave. The terminal device 1100 may further include the input/output apparatus, such as a touchscreen, a display screen, or a keyboard, and the input/output apparatus is mainly configured to receive data entered by a user and output data to the user. It should be noted that some types of terminal devices may not have input/output apparatuses.

After the terminal device is powered on, the processor may read the software program in a storage unit, interpret and execute the data of the software program, and process the data of the software program. When data needs to be wirelessly sent, after performing baseband processing on the to-be-sent data, the processor outputs a baseband signal to the radio frequency circuit. After performing radio frequency processing on the baseband signal, the radio frequency circuit sends a radio frequency signal in a form of electromagnetic wave through the antenna. When data is to be sent to the terminal device, the radio frequency circuit receives the radio frequency signal through the antenna, converts the radio frequency signal into a baseband signal, and outputs the baseband signal to the processor. The processor converts the baseband signal into data and processes the data.

A person skilled in the art may understand that for ease of description, FIG. 11 shows only one memory and one processor. An actual terminal device may include a plurality of processors and memories. The memory may also be referred to as a storage medium, a storage device, or the like. This is not limited in this embodiment of this application.

It should be noted that the processor in this embodiment of this application may be an integrated circuit chip and has a signal processing capability. In an embodiment process, the operations in the foregoing method embodiments can be implemented by a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, operations, and logical block diagrams that are disclosed in embodiments of this application. The general-purpose processor may be a microprocessor, or the processor may be any conventional processor or the like. The operations of the methods disclosed with reference to embodiments of this application may be directly performed and completed by a hardware decoding processor, or may be performed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory. The processor reads information in the memory and completes the operations in the foregoing methods in combination with hardware of the processor. In one embodiment, the processor may include a baseband processor and a central processing unit (CPU). The baseband processor is mainly configured to process a communications protocol and communications data. The CPU is mainly configured to control the entire terminal device, execute a software program, and process data of the software program. In one embodiment, the processor may alternatively be a network processor (NP) or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), a generic array logic (GAL), or any combination thereof. The memory in this embodiment of this application may be a volatile memory or a nonvolatile memory, or may include both a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not limitative description, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and the method described in this specification is intended to include, but not limited to, these memories and any memory of another proper type.

For example, in this embodiment of this application, the antenna and the radio frequency circuit that have transceiver functions may be considered as a transceiver unit 801 of the terminal device 1100. The processor that has a processing function may be considered as a processing unit 802 of the terminal device 1100.

As shown in FIG. 11, the terminal device 1100 may include the transceiver unit 801 and the processing unit 802. The transceiver unit may also be referred to as a transceiver, a transceiver machine, a transceiver apparatus, or the like. In one embodiment, a component that is in the transceiver unit 801 and that is configured to implement a receiving function may be considered as a receiving unit. A component that is in the transceiver unit 801 and that is configured to implement a sending function may be considered as a sending unit. That is, the transceiver unit 801 includes the receiving unit and the sending unit. For example, the receiving unit may also be referred to as a receiver machine, a receiver, a receiver circuit, or the like. The sending unit may be referred to as a transmitter machine, a transmitter, a transmitter circuit, or the like.

In some embodiments, the transceiver unit 801 and the processing unit 802 may be integrated into one device, or may be separated as different devices. In addition, the processor and the memory may be integrated into one device, or may be separated as different devices.

For example, the transceiver unit 801 may be configured to perform the methods shown in FIG. 2 and FIG. 5. For another example, the transceiver unit 801 may be further configured to perform the method shown in 301 and 302 in FIG. 3, may be further configured to perform the method shown in 401 in FIG. 4, may be further configured to perform the method shown in 601 to 604 in FIG. 6, and may be further configured to perform the method shown in 701 and 703 in FIG. 7.

For example, the processing unit 802 may be further configured to perform the corresponding methods shown in FIG. 3, FIG. 4, FIG. 6, and FIG. 7. For example, the processing unit 802 may be configured to perform the method shown in 303 in FIG. 3. For another example, the processing unit 802 may be further configured to perform the method shown in 402 in FIG. 4. Details are not described herein one by one.

Figure 12:
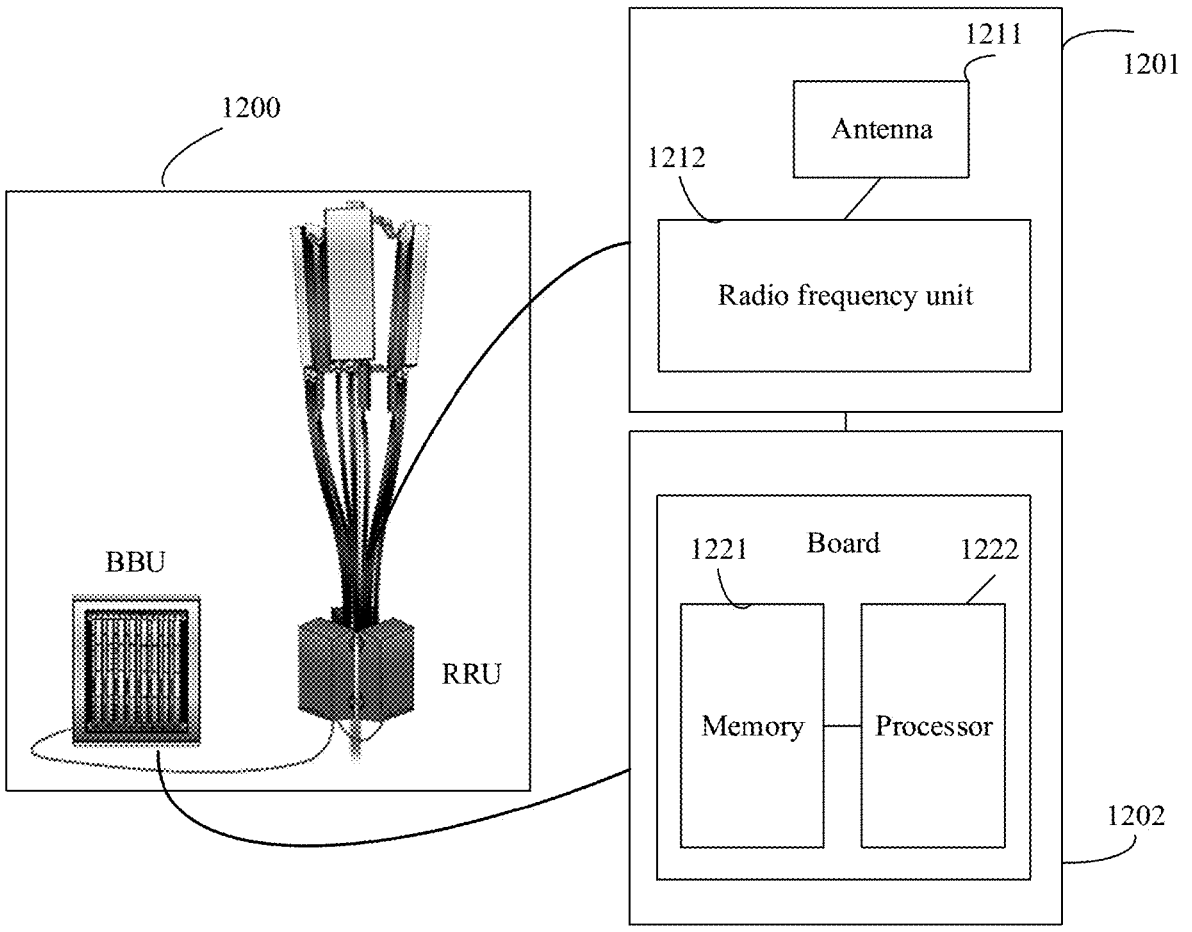
FIG. 12 is a schematic diagram of a structure of a network device according to an embodiment of this application.

FIG. 12 is a schematic diagram of a structure of a network device 1200 according to an embodiment of this application. The network device may perform operations of the first network device (for example, the source base station) in the methods shown in FIG. 2 to FIG. 7, and FIG. 13, or the network device may perform operations of the communications apparatus shown in FIG. 9. Alternatively, the network device may perform operations of the second network device (for example, the target base station) in the methods shown in FIG. 2 to FIG. 7, and FIG. 13.

The network device 1200 includes one or more remote radio units (RRUs) 1201 and one or more baseband units (BBUs) 1202. The RRU 1201 may be referred to as a transceiver unit, a transceiver machine, a transceiver circuit, a transceiver, or the like, and may include at least one antenna 1212 and a radio frequency unit 1212. The RRU 1201 part is mainly configured to receive and send a radio frequency signal, and perform conversion between the radio frequency signal and a baseband signal. The BBU 1202 part is mainly configured to perform baseband processing, control the network device, and the like. The RRU 1201 and the BBU 1202 may be physically disposed together, or may be physically disposed separately, that is, may be distributed network devices.

The BBU 1202 is a control center of the network device, may also be referred to as a processing unit, and is mainly configured to complete baseband processing functions such as channel coding, multiplexing, modulation, and spectrum spreading.

In an example, the BBU 1202 may include one or more boards. A plurality of boards may jointly support a radio access network (such as an LTE network) of a single access standard, or may separately support radio access networks of different access standards. The BBU 1202 further includes a memory 1221 and a processor 1222. The memory 1221 is configured to store a message and data. The processor 1222 is configured to control the network device to perform a action, for example, control the network device to perform a corresponding operation shown in FIG. 12. The memory 1221 and the processor 1222 may serve the one or more boards. That is, the memory and the processor may be disposed individually on each board. Alternatively, the plurality of boards may share a same memory and processor. In addition, a circuit is further disposed on each board. In one embodiment, the processor may be a CPU, an NP, or a combination of a CPU and an NP. The processor may further include a hardware chip. The hardware chip may be an ASIC, a PLD, or a combination thereof. The PLD may be a CPLD, an FPGA, a GAL, or any combination thereof. The memory may include a volatile memory, such as a RAM. The memory may alternatively include a non-volatile memory, for example, a flash memory, a hard disk drive, or a solid-state drive. The memory may further include a combination of the foregoing types of memories.

It may be understood that for an implementation of the network device in this embodiment of this application, refer to the foregoing embodiments. Details are not described herein again.

It may be understood that the network device shown in FIG. 12 is merely an example. In one embodiment, there may be another type of network device. Therefore, the network device shown in FIG. 12 should not be understood as a limitation on embodiments of this application.

It may be understood that, according to the method provided in embodiments of this application, this application further provides a computer program product. The computer program product includes computer program code. When the computer program code is run on a computer, the computer is enabled to perform the methods in the embodiments shown in FIG. 2 to FIG. 7, and FIG. 13. Further, the computer may be enabled to perform, based on the scenarios provided in embodiments of this application, the methods shown in FIG. 2 to FIG. 7, and FIG. 13.

According to the method provided in embodiments of this application, this application further provides a computer-readable medium. The computer-readable medium stores program code. When the program code is run on a computer, the computer is enabled to perform the methods in the embodiments shown in FIG. 2 to FIG. 7, and FIG. 13. Further, the computer may be enabled to perform, based on the scenarios provided in embodiments of this application, the methods shown in FIG. 2 to FIG. 7, and FIG. 13.

According to the method provided in embodiments of this application, this application further provides a communications system, including the foregoing terminal device, the foregoing first network device, and the foregoing second network device. The terminal device may be configured to perform the methods shown in FIG. 2 to FIG. 7, and FIG. 13 provided in embodiments of this application. The first network device may be configured to perform the methods of the source base station shown in FIG. 2 to FIG. 7, and FIG. 13 according to embodiments of this application. The second network device may be configured to perform the methods of the target base station shown in FIG. 2 to FIG. 7, and FIG. 13 according to embodiments of this application.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center that integrates one or more usable media. The usable medium may be a magnetic medium (for example, a floppy disk, a hard disk drive, or a magnetic tape), an optical medium (for example, a high-density digital video disc (DVD)), a semi-conductor medium (for example, a solid-state drive (SSD)), or the like.

A person of ordinary skill in the art may be aware that various illustrative logical blocks (illustrative logical blocks) and operations described with reference to embodiments disclosed in this specification can be implemented by electronic hardware or a combination of computer software and electronic hardware. Whether the functions are performed by using hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

The foregoing descriptions are merely embodimentsof this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A connection resume method comprising:

sending, by a terminal device, a first message that carries first indication information to a first network device, wherein the first indication information is used to indicate to calculate a resume message authentication code (MAC) value based on a first parameter set, and the first parameter set comprises a resume cause value and a radio resource control (RRC) resume request message, wherein the first message includes an access stratum (AS) security mode complete message;

receiving, by the terminal device, a second message from the first network device; and when the second message carries second indication information, sending, by the terminal device, an RRC resume request message that carries the resume MAC value to a second network device, wherein the second indication information is used to indicate to verify the resume MAC value based on the first parameter set.

2. The method according to claim 1 wherein the second message is an RRC release message, or the second message is a broadcast message.

3. The method according to claim 1, wherein the first parameter set further comprises input parameters.

4. The method according to claim 3, wherein the input parameters include source cell radio network temporary identifier, a source cell radio network identifier, source physical cell identifier, a resume constant, and a target cell identifier.

5. The method according to claim 1, wherein the first parameter set further comprises a spare information bit, or a channel quality indicator (CQI)-narrowband physical downlink control channel (NPDCCH).

6. The method according to claim 1, wherein the first parameter set further comprises a channel quality indicator (CQI)-narrowband physical downlink control channel (NPDCCH).

7. A connection resume method comprising:

receiving, by a first network device, a first message that is from a terminal device and that carries first indication information, wherein the first indication information is used to indicate to calculate a resume message authentication code (MAC) value based on a first parameter set, and the first parameter set comprises a resume cause value and a radio resource control (RRC) resume request message, wherein the first message includes an access stratum (AS) security mode complete message; and sending, by the first network device, a second message that carries second indication information to the terminal device, wherein the second indication information is used to indicate to verify the resume MAC value based on the first parameter set.

8. The method according to claim 7, wherein the method further comprises:

receiving, by the first network device, a retrieve UE context request message that carries the resume MAC value; and verifying, by the first network device, the resume MAC value based on the first parameter set.

9. The method according to claim 7, wherein the second message is an RRC connection release message, or the second message is a broadcast message.

10. A communications apparatus comprising:

a transceiver;

at least one processor; and one or more memories coupled to the at least one processor storing programming instructions for execution by the at least one processor to cause the communications apparatus to:

send a first message that carries first indication information to a first network device, wherein the first indication information is used to indicate to calculate a resume message authentication code (MAC) value based on a first parameter set, and the first parameter set comprises a resume cause value and a radio resource control (RRC) resume request message, wherein the first message includes an access stratum (AS) security mode complete message; and receive a second message from the first network device, wherein when the second message carries second indication information, send an RRC resume request message that carries the resume MAC value to a second network device, wherein the second indication information is used to indicate to verify the resume MAC value based on the first parameter set.

11. The apparatus according to claim 10, wherein the second message is an RRC release message, or the second message is a broadcast message.

12. A communications apparatus comprising:

a transceiver;

at least one processor; and one or more memories coupled to the at least one processor storing programming instructions for execution by the at least one processor to cause the communications apparatus to:

receive a first message that is from a terminal device and that carries first indication information, wherein the first indication information is used to indicate to calculate a resume message authentication code (MAC) value based on a first parameter set, and the first parameter set comprises a resume cause value and a radio resource control (RRC) resume request message, wherein the first message includes an access stratum (AS) security mode complete message; and send a second message that carries second indication information to the terminal device, wherein the second indication information is used to indicate to verify the resume MAC value based on the first parameter set.

13. The apparatus according to claim 12, wherein the programming instructions, when executed by the at least one processor, cause the communications apparatus to:

receive a retrieve UE context request message that carries the resume MAC value; and verify the resume MAC value based on the first parameter set.

14. The apparatus according to claim 12, wherein the second message is an RRC connection release message, or the second message is a broadcast message.

* * * * *